(12) United States Patent
Shen et al.

(10) Patent No.: US 12,373,059 B2
(45) Date of Patent: *Jul. 29, 2025

(54) MULTI-FREQUENCY SIMULTANEOUS ABSOLUTE CAPACITANCE TOUCH SENSING

(71) Applicant: Synaptics Incorporated, San Jose, CA (US)

(72) Inventors: Guozhong Shen, Fremont, CA (US); Chunbo Liu, San Jose, CA (US); Jonathan Ku, Campbell, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,947

(22) Filed: Feb. 2, 2024

(65) Prior Publication Data

US 2024/0168584 A1 May 23, 2024

Related U.S. Application Data

(63) Continuation of application No. 17/899,570, filed on Aug. 30, 2022, now Pat. No. 11,934,612.

(51) Int. Cl.
G06F 3/041 (2006.01)
G06F 3/044 (2006.01)

(52) U.S. Cl.
CPC ........ G06F 3/04166 (2019.05); *G06F 3/0446* (2019.05)

(58) Field of Classification Search
None
See application file for complete search history.

(56) References Cited

U.S. PATENT DOCUMENTS

| | | |
|---|---|---|
| 9,256,329 B1 | 2/2016 | Shen et al. |
| 2008/0309628 A1 | 12/2008 | Krah et al. |
| 2012/0068966 A1 | 3/2012 | Washburn et al. |
| 2021/0184675 A1 | 6/2021 | Yamada |
| 2021/0200415 A1 | 7/2021 | Jun et al. |

OTHER PUBLICATIONS

U.S. Appl. No. 17/899,570, filed Aug. 30, 2022.

*Primary Examiner* — Krishna P Neupane
(74) *Attorney, Agent, or Firm* — Leydig, Voit & Mayer, Ltd.

(57) ABSTRACT

A sensing circuit configured to detect an input object proximate to a sensing region of an input device is provided. The sensing circuit includes an amplifier having an output and is configured to output a resulting signal. The sensing circuit also includes a plurality of mixers configured to receive the resulting signal from the output of the amplifier and to generate a plurality of output signals. At least one output signal is selected based on a comparison of a signal-to-noise ratio of each of the plurality of output signals with a noise threshold. The at least one output signal is selected according to criteria relative to the noise threshold. The input object is detected using the selected at least one output signal.

20 Claims, 4 Drawing Sheets

MULTI-FREQUENCY SIMULTANEOUS ABSOLUTE CAPACITANCE TOUCH SENSING

CROSS-REFERENCE TO RELATED APPLICATIONS

This application is a continuation of U.S. patent application Ser. No. 17/899,570 filed on Aug. 30, 2022, which application is incorporated by reference in its entirety.

TECHNICAL FIELD

The described embodiments relate generally to electronic devices, more specifically, to touch sensors.

BACKGROUND

Input devices including touch sensor devices (e.g., touchpads or touch sensor devices) are widely used in a variety of electronic systems. A touch sensor device typically includes a sensing region, often demarked by a surface, in which the touch sensor device determines the presence, location, and/or motion of one or more input objects. Touch sensor devices may be used to provide interfaces for the electronic system. For example, touch sensor devices are often used as input devices for larger computing systems (such as opaque touchpads integrated in, or peripheral to, notebook or desktop computers). Touch sensor devices exist in different sizes. The number of sensor electrodes in a touch sensor device may depend on the size of the touch sensor device. The number of sensor electrodes in a larger touch sensor device may pose a challenge, particularly when a higher temporal resolution of the touch sensing is desired.

SUMMARY

In general, in one aspect, one or more embodiments relate to an input device that includes multiple electrodes disposed in a sensing region of the input device and a sensing circuit coupled to a first electrode and configured to detect an input object proximate the sensing region. The sensing circuit includes an amplifier having an inverting input coupled to the first electrode, a non-inverting input coupled to a drive signal, and an output generating a resulting signal. The sensing circuit also includes a feedback capacitor coupled between the output of the amplifier and the inverting input of the amplifier. The drive signal comprises a first sinusoidal signal having a first operating frequency and a second sinusoidal signal having a second operating frequency. The resulting signal is determined by the feedback capacitor and a capacitance of the first electrode caused by the input object and the resulting signal generates a sensing signal on the first electrode.

In another aspect, one or more embodiments relate to a system comprising a display and an input device coupled to the display. The input device includes multiple electrodes disposed in a sensing region of the input device and a sensing circuit coupled to a first electrode and configured to detect an input object proximate the sensing region. The sensing circuit includes an amplifier having an inverting input coupled to the first electrode, a non-inverting input coupled to a drive signal, and an output generating a resulting signal. The sensing circuit also includes a feedback capacitor coupled between the output of the amplifier and the inverting input of the amplifier. The drive signal comprises a first sinusoidal signal having a first operating frequency and a second sinusoidal signal having a second operating frequency. The resulting signal is determined by the feedback capacitor and a capacitance of the first electrode caused by the input object and the resulting signal generates a sensing signal on the first electrode.

In still another aspect, one or more embodiments relate to a method for operating an input device including coupling a sensing circuit to a first one of a plurality of electrodes disposed in a sensing region of the input device, the sensing circuit comprising an amplifier having an inverting input coupled to a first electrode of the plurality of electrodes. The method also includes applying a drive signal to a non-inverting input of the amplifier to thereby generate a resulting signal on an output of the amplifier. The drive signal comprises a first sinusoidal signal having a first operating frequency and a second sinusoidal signal having a second operating frequency. The method includes generating from the resulting signal a sensing signal on the first electrode, wherein the resulting signal is determined by a capacitance of the first electrode and a feedback capacitor coupled between the output of the amplifier and the inverting input of the amplifier. The capacitance of the first electrode is determined by a capacitance of an input object proximate the sensing region.

Other aspects of the embodiments will be apparent from the following description and the appended claims.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, brief summary, brief description of drawings, or the following detailed description.

The disclosure describes a method to drive a touch sensor with multiple frequencies concurrently in order to measure an absolute capacitance (abs-cap) profile for a touch screen sensor. Using the disclosed method, an improved abs-cap profile may be available under noisy conditions. By being able to sense on multiple frequencies concurrently, the ability of the touch system to accurately determine positional information about input objects is not as affected by noise. Thus, the disclosed method may improve the noise immunity of a touch system without increasing sensing time.

Figure 1:
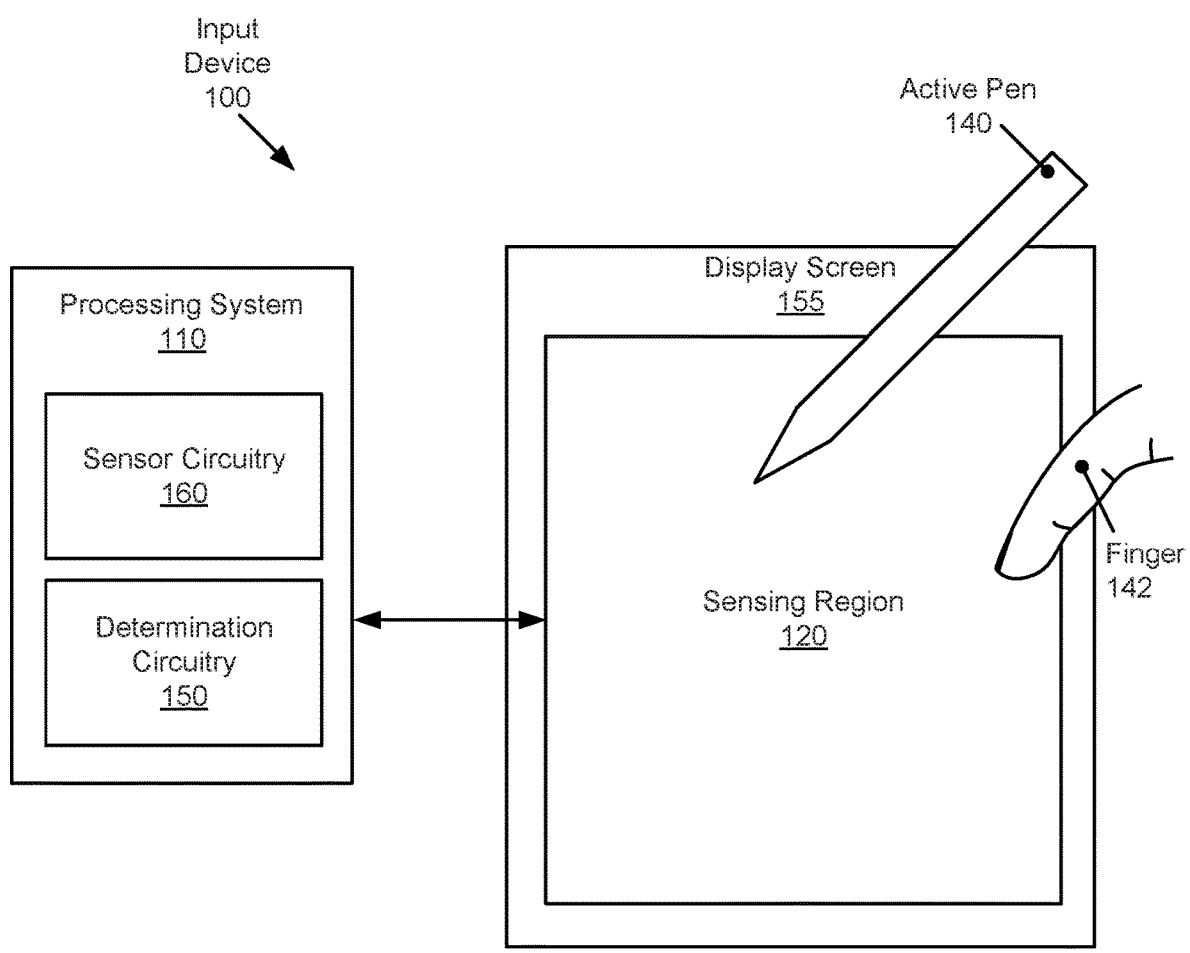
FIG. 1 shows a block diagram of an input device, in accordance with one or more embodiments.

FIG. 1 is a block diagram of an exemplary input device (100), in accordance with embodiments. The input device (100) may be configured to provide input to an electronic system (not shown). As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, and personal digital assistants (PDAs). Additional examples of electronic systems include composite input devices, such as physical keyboards that include input device (100) and separate joysticks or key switches. Further examples of electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

In FIG. 1, the input device (100) is shown as a touch sensor device (e.g., "touchpad" or a "touch sensor device") configured to sense input provided by one or more input objects in a sensing region (120). Example input objects include styli, an active pen (140), and a finger (142). Further, which particular input objects are in the sensing region may change over the course of one or more gestures. For example, a first input object may be in the sensing region to perform the first gesture. Subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects). The sizes, shapes, and locations of particular sensing regions may vary widely from embodiment to embodiment.

The input device (100) may use any combination of sensor components and sensing technologies to detect user input in the sensing region (120). The input device (100) includes one or more sensing elements for detecting user input. The sensing elements may be capacitive.

In some capacitive implementations of the input device (100), voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitance measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and, in various embodiments, the reference voltage may be system ground.

In some embodiments, transmitter sensor electrodes and receiver sensor electrodes may both be modulated. The transmitter electrodes may be modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect (s) may be the transmitter signal, a change in the transmitter signal caused by one or more input objects and/or environmental interference, or other such effects. Sensor electrodes may be dedicated transmitters or receivers or may be configured to both transmit and receive. Measurements acquired using mutual capacitance sensing methods may be referred to as mutual capacitance measurements.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system (110) for a mutual capacitance sensor device may include transmitter circuitry configured to transmit signals with transmitter sensor electrodes, and/or receiver circuitry configured to receive signals with receiver sensor electrodes. Further, a processing system (110) for an absolute capacitance sensor device may include driver circuitry configured to drive absolute capacitance signals onto sensor electrodes, and/or receiver circuitry configured to receive signals with those sensor electrodes. In one or more embodiments, a processing system (110) for a combined mutual and absolute capacitance sensor device may include any combination of the above described mutual and absolute capacitance circuitry. A processing system (110) may further include receiver circuitry configured to receive signals emitted by a different source, e.g., an active pen (140). The signals by the active pen (140) may be received by the receiver sensor electrodes, while transmit signals are not necessarily emitted by transmitter sensor electrodes.

In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens (155), driving haptic actuators, etc.

The processing system (110) may be implemented as a set of modules that handle different functions of the processing system (110). The circuitry may be configured to execute firmware or software that, when executed, causes performance of at least a portion of the disclosed method. As shown in FIG. 1, the processing system (110) may include a determination circuitry (150) and a sensor circuitry (160). The determination circuitry (150) may include functionality to determine when at least one input object is in a sensing region, signal to noise ratio, positional information of an input object, a gesture, an action to perform based on the gesture, a combination of gestures or other information, and/or other operations.

The sensor circuitry (160) may include functionality to drive the sensing elements to transmit transmitter signals and receive the resulting signals. For example, the sensor circuitry (160) may include sensory circuitry that is coupled to the sensing elements. The sensor circuitry (160) may include, for example, a transmitter circuitry and a receiver circuitry. The transmitter circuitry may include transmitter circuitry that is coupled to a transmitting portion of the sensing elements. The receiver circuitry may include receiver circuitry coupled to a receiving portion of the sensing elements and may include functionality to receive the resulting signals. The receiver circuitry of the sensor circuitry (160) may receive resulting signals from sensor electrodes in the electrode pattern using a capacitive sensing signal having a sensing frequency, e.g., generated by the transmitter circuitry. The resulting signals may include desired signals, such as active pen data or signal components caused by an input object being in proximity to the electrode pattern, or undesired signals, such as noise or interference. As will be described in greater detail below, the sensor circuitry (160) may perform one or more demodulation operations on the resulting signal.

Further, the circuitry may be combined in separate integrated circuits. For example, a first circuitry may be comprised at least partially within a first integrated circuit and a separate circuitry may be comprised at least partially within a second integrated circuit. Further, portions of a single circuitry may span multiple integrated circuits.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

In some embodiments, the input device (100) includes a touch screen interface, and the sensing region (120) overlaps at least part of an active area of a display screen (155). For example, the input device (100) may include substantially transparent sensor electrodes overlaying the display screen and provide a touch screen interface for the associated electronic system.

While FIG. 1 shows a configuration of components, other configurations may be used without departing from the scope of the disclosure. For example, various components may be combined to create a single component. As another example, the functionality performed by a single component may be performed by two or more components. Further, while a configuration for touch sensing is described, other variables such as force may be sensed.

Figure 2:
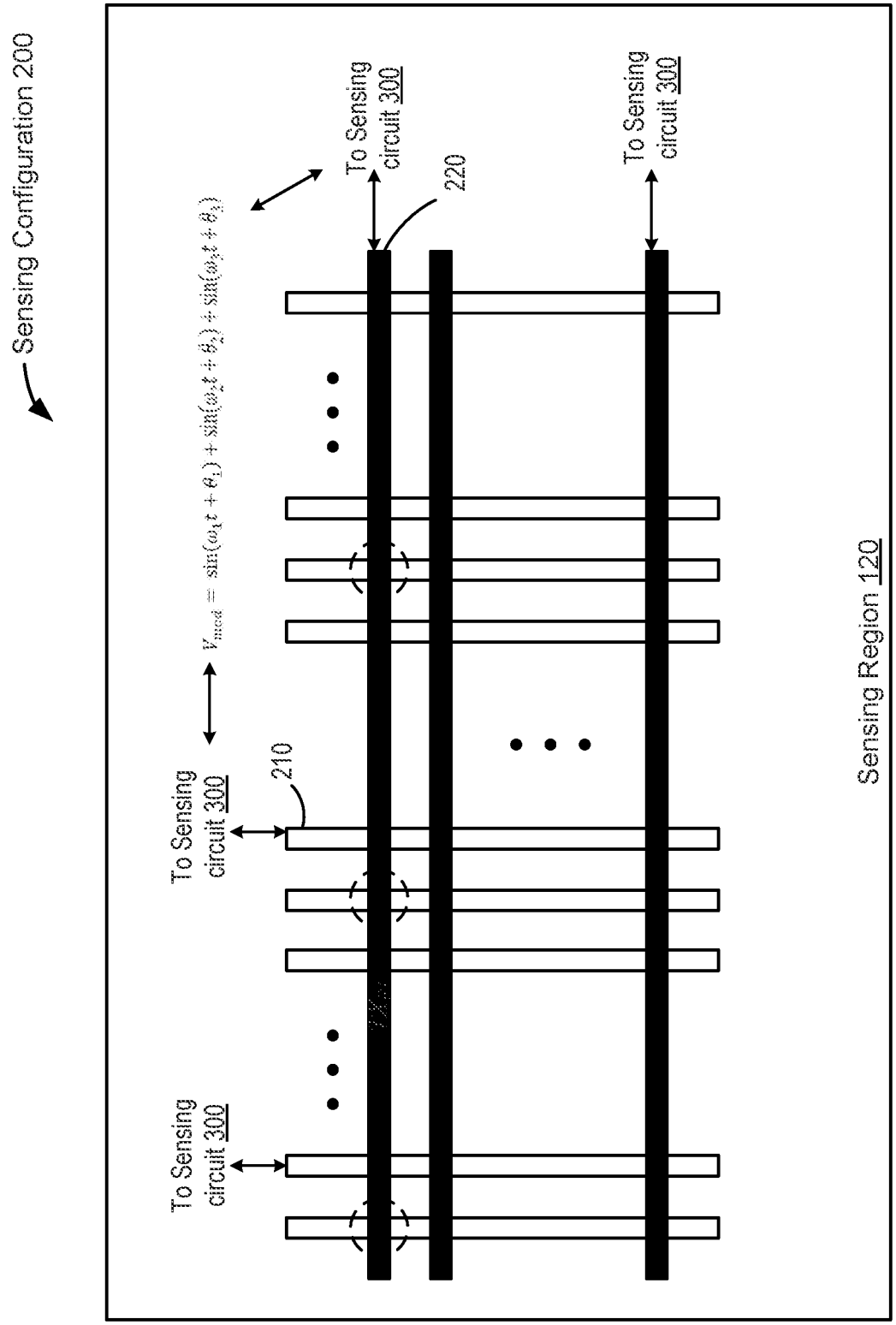
FIG. 2 shows a sensing region in accordance with one or more embodiments.

FIG. 2 shows a sensing configuration (200), in accordance with one or more embodiments. In FIG. 2, sensing region (120) includes "C" column sensor electrodes, including example column sensor electrode (210), which appear as unshaded elongated rectangular structures. Sensing region also includes "R" row sensor electrodes, includes example row sensor electrode (220), which appear as dark shaded elongated rectangular structures.

FIG. 2 shows an example of absolute capacitance sensing. The same electrodes and connected circuitry may be used for absolute capacitance sensing and transcapacitance sensing. Absolute capacitance sensing may be performed on a per axis basis. Namely, a measured axis (i.e., horizontal or vertical axis at a particular time) is the axis of electrodes in which measurements are acquired for the particular time. The axis that is the measured axis changes. For example, at a first time, a measurement may be acquired for each of the row sensor electrodes making the measured axis the vertical axis. In the example, at a second time, a measurement may be acquired for each of the column sensor electrodes thereby making the vertical axis the measured axis.

The row and column sensor electrodes implement absolute capacitance sensing methods based on changes in the capacitive coupling between the sensor electrodes and an input object. If the input object is proximate the sensor electrodes, the electric field near the sensor electrodes is altered, thus changing the measured capacitive coupling. In one implementation, an absolute capacitance sensing method operates by modulating an axis of sensor electrodes with respect to a reference signal, $V_{mod}$, that is generated by a sensing circuit (300), explained below in FIG. 3.

Figure 3:
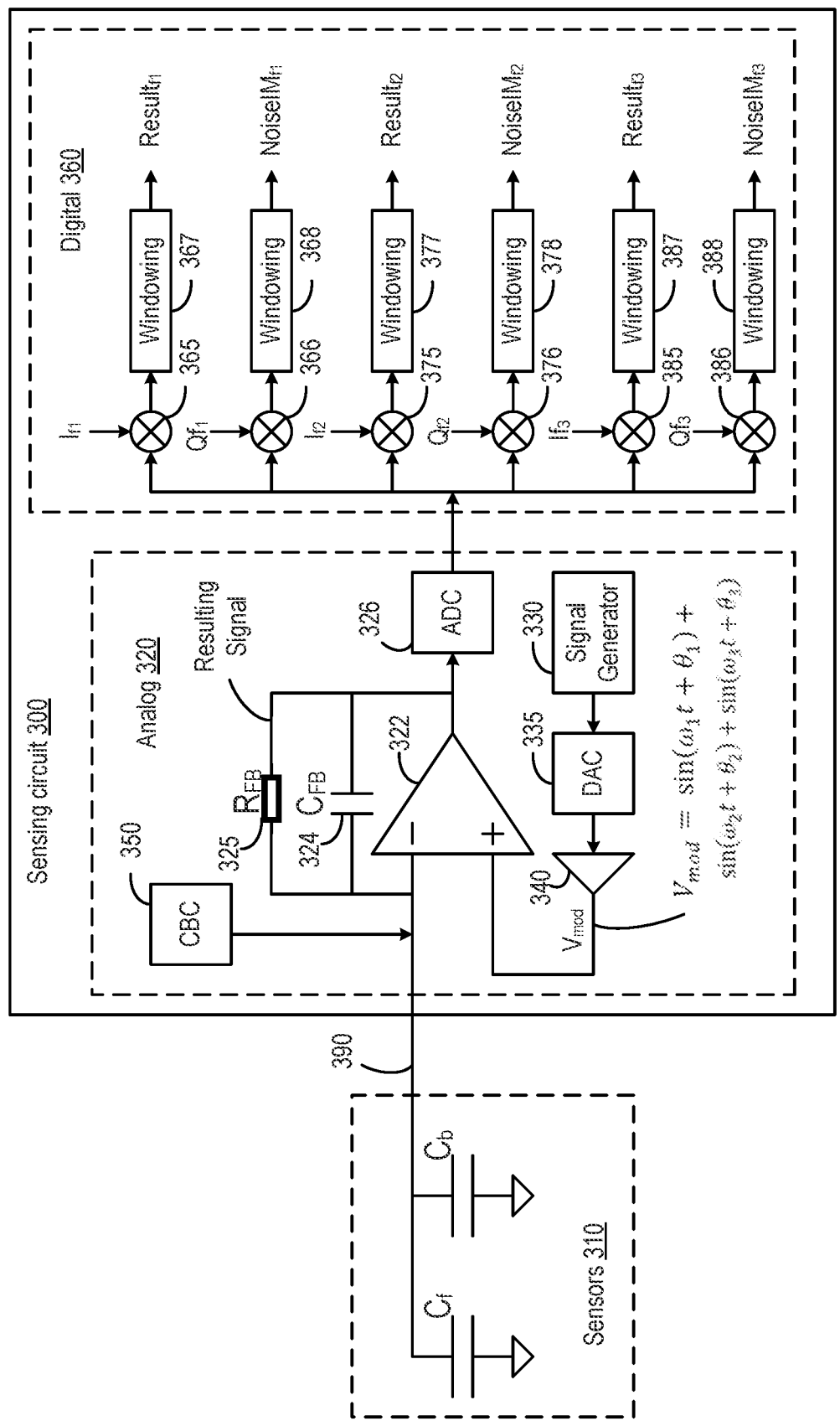
FIG. 3 shows a sensing circuit in accordance with one or more embodiments.

FIG. 3 shows a sensing circuit (300) in accordance with one or more embodiments. The sensing circuit (300) includes an analog circuit block (320) and a digital circuit block (360) that is coupled to the sensing region (120) by a sensing line (390). The sensors (310) represent the column sensor electrodes and row sensor electrodes in the sensing region (120), as seen by the sensing circuit (300). Collectively, the sensor electrodes (310) have a background capacitance $C_b$, that is relatively large and relatively constant. The sensors (310) also have an input object capacitance $C_f$, that is caused when an input object is in proximity with the sensor electrodes in the sensing region (120). The input object capacitance $C_f$ is variable and is generally much smaller than the background capacitance $C_b$.

Returning to FIG. 2, according to the principles of the present disclosure, the $V_{mod}$ reference signal is a composite signal that includes multiple sinusoidal waveforms at different frequencies that are applied concurrently to a row sensor electrode or a column sensor electrode. Namely, a same single sensor electrode is driven with a composite signal having multiple frequencies during absolute capacitance sensing. Multiple sensor electrodes, such as each sensor electrode or at least a portion of the sensor electrodes along the measured axis may be driven concurrently, each with the composite signal that includes the multiple frequencies.

During absolute capacitance sensing, the measured axis is driven by an amplifier (or charge integrator) in the sensing circuit (300) that generates the $V_{mod}$ reference signal and the other axis may be driven by a guarding signal having the same waveform shape as the $V_{mod}$ signal. The $V_{mod}$ guarding signal guards electrodes not under measurement to avoid transcapacitive change caused by an input object interfering with absolute capacitance measurement. The $V_{mod}$ reference signal is used to detect changes caused by the smaller input object capacitance $C_f$.

By way of example, if the row sensor electrode (220) in the horizontal axis is being measured using the $V_{mod}$ reference signal, the $V_{mod}$ guarding signal may be applied to the column sensor electrodes in the vertical axis, including column sensor electrode (210). Similarly, if the column sensor electrode (210) in the vertical axis is being measured using the $V_{mod}$ reference signal, the $V_{mod}$ guarding signal may be applied to the row sensor electrodes in the horizontal axis, including row sensor electrode (220).

In an example embodiment, the $V_{mod}$ reference signal includes three sinusoidal signals and is given by:

$$V_{mod}=\sin(\omega_1 t+\theta_1)+\sin(\omega_2 t+\theta_2)+\sin(\omega_3 t+\theta_3), \quad \text{(Eqn. 1)}$$

where:

$\omega_1=2\pi f_1$, $\omega_2=2\pi f_2$, and $\omega_3=2\pi f_3$.

The three sensing frequencies $f_1$, $f_2$, and $f_3$, are orthogonal, or spaced apart from each other, and are not integer multiples of each other. This frequency selection significantly reduces the chance that all three frequencies are noisy at the same time. In alternate embodiments, two frequencies or four or more frequencies may be used instead of three frequencies.

In an embodiment, each of the C column sensor electrodes may be coupled to an individual sensing circuit (300) and each of the R row sensor electrodes may be coupled to an individual sensing circuit (300) for a total of (C+R) sensing circuits (300). In an alternate embodiment, fewer than (C+R) sensing circuits may be connected to the C column sensor electrodes and R row sensor electrodes by using switches or multiplexers (not shown).

Returning to FIG. 3, the sensing circuit (300) includes an analog circuit block (320) and a digital circuit block (360) that are coupled to the sensing electrodes in the sensing region (120) by a sensing line (390). The row and column sensing electrodes are illustrated collectively as sensors (310) in a dotted line block. The analog circuit block (320) includes an operational amplifier (322), a feedback capacitor (324) having a value $C_{FB}$, and an analog-to-digital converter (ADC) (326). The analog circuit block (320) further includes a signal generator (330) that generates the $V_{mod}$ reference signal in digital form, a digital-to-analog (DAC) (335) that converts the $V_{mod}$ reference signal to an analog waveform, and a buffer (340) that outputs a $V_{mod}$ "drive" signal that drives the non-inverting input of the operational amplifier (322).

The operational amplifier (322) operates as a charge integrator that produces a resulting signal on an output port. The resulting signal is an output voltage that is proportional to the integrated value of the input current. The gain of the circuit depends on the value of the feedback capacitor (324). The analog resulting signal at the output of the operational amplifier (322) is converted by the ADC (326) to a digital resulting signal that is input to the digital circuit block (360).

Optionally, analog circuit block (320) may include a feedback resistor (325) having a value $R_{FB}$. The feedback resistor (325) in parallel with capacitor (324) functions as a high pass filter to remove low frequency components. For absolute capacitance sensing, two types of sensing operations may occur: discrete time sensing and continuous time sensing. Discrete time sensing (also called step-and-wait) samples every half sensing cycle. In this mode, $C_{FB}$ may be reset every half sensing cycle, so $R_{FB}$ is not needed. Continuous time sensing resets $C_{FB}$ at the beginning of the burst and then relies on $R_{FB}$ to remove low frequency components to avoid analog front end saturation during the burst.

The sensing circuit (300) may include a coarse baseline compensation (CBC) circuit (350) that generates a $V_{mod}$ guarding signal. In alternate embodiments, the CBC circuit (350) may be located elsewhere in input device (100). As described above, the $V_{mod}$ guarding signal may be applied to electrodes on one axis (e.g., vertical), while the $V_{mod}$ reference signal is used to generate a sensing signal on an electrode on the other axis (e.g., horizontal). As noted above, the $V_{mod}$ guarding signal guards electrodes not under measurement to avoid transcapacitive change caused by an input object interfering with absolute capacitance measurement. The $V_{mod}$ reference signal is used to detect changes caused by the much smaller input object capacitance $C_f$. In this manner, CBC circuit protects the dynamic range of the amplifier 422, which might otherwise be saturated by the large background capacitance $C_b$. Since the background capacitance $C_b$ changes very little, the CBC is relatively constant and may compensate for as much as 95% of the background capacitance $C_b$.

The resulting signal at the output of the operational amplifier (322) is determined by the value of the feedback capacitor (324), the combined capacitance of the background capacitance $C_b$ and the input object capacitance $C_f$. The resulting signal will also contain noise signals that are generated in the column sensor electrodes and the row sensor electrodes.

The ADC (326) digitizes the resulting signal and transmits the digital resulting signal to the digital circuit block (360). The digital resulting signal is applied to the inputs of a plurality of mixers configured to receive the resulting signal and to generate a plurality of output result signals, including a Result$_{f1}$ signal, a Result$_{f2}$ signal, and a Result$_{f3}$ signal. The plurality of mixers also produces a plurality of noise signals, including a NoiseIM$_{f1}$ signal, a NoiseIM$_{f2}$ signal, and a NoiseIM$_{f3}$ signal.

By way of example, mixer (365) receives the digitized resulting signal from the ADC (326) and an in-phase ($I_{f1}$) signal at the operating frequency f1 and demodulates the digitized resulting signal to generate an in-phase output signal. The output of the mixer (365) is low-pass filtered by windowing circuit (367). The mixer (365) and the windowing circuit (367) operate as a bandpass filter that isolates the frequencies of interest (i.e., $f_1$) in the Result$_{f1}$ signal. Similarly, mixer (366) receives the digitized resulting signal from the ADC (326) and a quadrature ($Q_{f1}$) signal at the operating frequency f1 and demodulates the digitized resulting signal to generate a quadrature output signal. The output of the mixer (367) is low-pass filtered by windowing circuit (368). The mixer (366) and the windowing circuit (368) together operate as a bandpass filter that isolates the noise signals at the frequency $f_1$ in the $Noise_{f1}$ signal.

The mixer (375) and the windowing circuit (377) operate in a similar manner to the mixer (365) and the windowing circuit (367) in order to isolate the frequencies of interest (i.e., $f_2$) in the $Result_{f2}$ signal. Similarly, the mixer (376) and the windowing circuit (378) operate in a similar manner to the mixer (366) and the windowing circuit (368) in order to isolate the noise signals at the frequency $f_2$ in the $Noise_{f2}$ signal. For the sake of brevity, the operations of the mixers (375) and (376) and the windowing circuits (377) and (378) need not be described in further detail.

Likewise, the mixer (385) and the windowing circuit (387) operate in a similar manner to the mixer (365) and the windowing circuit (367) in order to isolate the frequencies of interest (i.e., $f_3$) in the Results signal. Also, the mixer (386) and the windowing circuit (388) operate in a similar manner to the mixer (366) and the windowing circuit (368) in order to isolate the noise signals at the frequency $f_3$ in the $Noise_{f3}$ signal. For the sake of brevity, the operations of the mixers (385) and (386) and the windowing circuit (387) and (388) need not be described in further detail.

In an example embodiment, each mixer waveform has independent phase control, which can be adjusted to have signal only on, for example, the I mixer, so that the Q mixer may be used as a noise indicator. In an example embodiment, if all three sensing frequencies $f_1$, $f_2$, and $f_3$ have a signal-to-noise ratio (SNR) value that is below a predefined noise threshold value, then the mean of the three results (i.e., $Result_{f1}$ signal, $Result_{f2}$ signal, $Result_{f3}$ signal) may be used to determine the overall result. However, if one or two of the sensing frequencies $f_1$, $f_2$, and $f_3$ exceeds the noise threshold, then the high noise result(s) may be excluded, and the mean value of the low noise frequency(ies) may be used. If all three sensing frequencies are noisy, then the sensing frequency having the lowest level of noise may be used.

By arranging the phases between the $f_1$, $f_2$, and $f_3$ frequencies properly, a higher total driving signal may be achieved compared with a single frequency drive. Analysis shows that a peak value may be controlled under an amplitude of "2" by adding three sine waves with an amplitude of "1". This means the total sensing signal can be increased by 50% using a multi-frequency drive signal. With the disclosed method, a multi-frequency absolute capacitance profile may be measured for every touch frame, whether in quiet frequencies state or multi-frequencies state. This significantly improves noise immunity.

Figure 4:
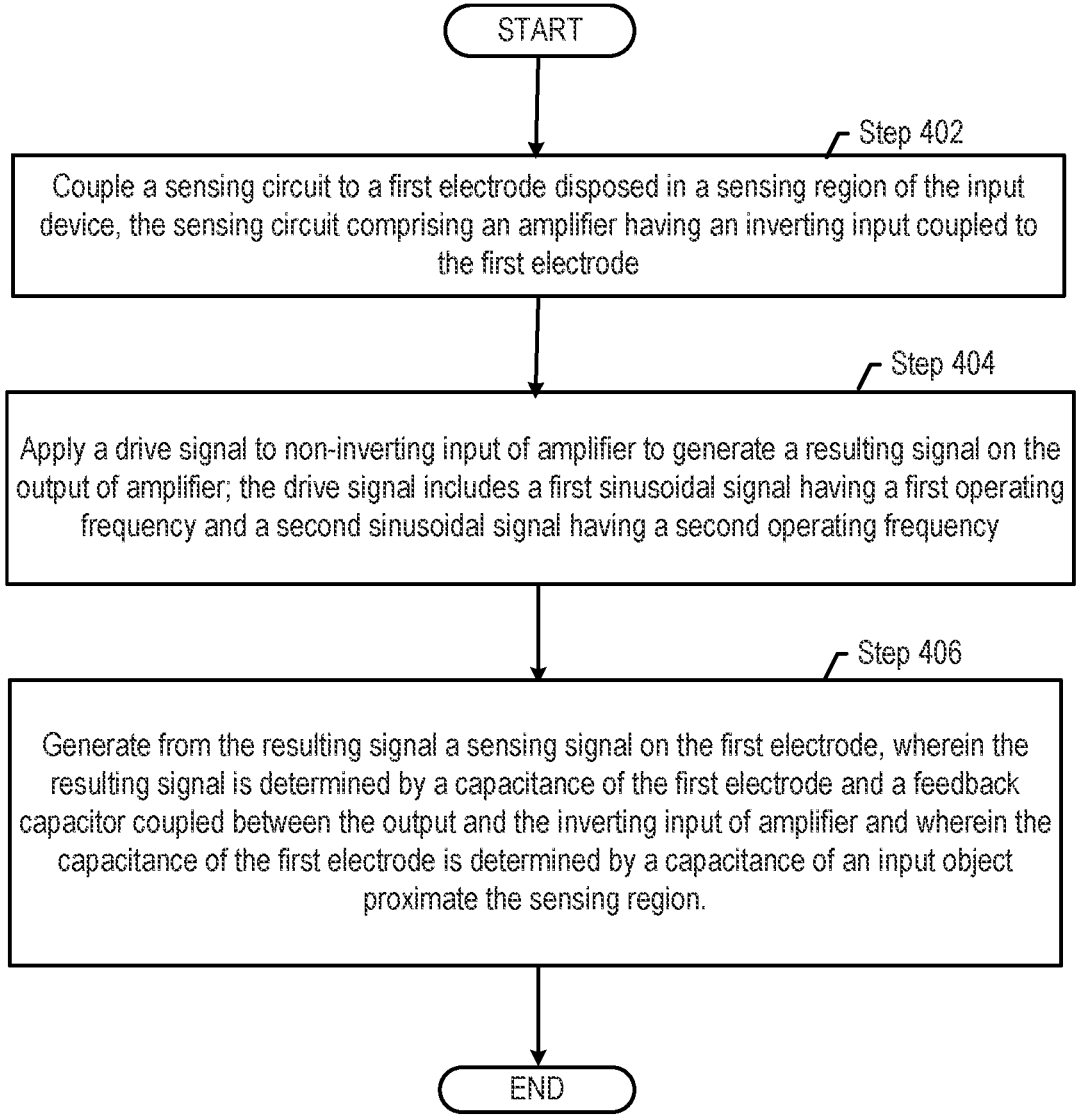
FIG. 4 shows a flowchart describing a method for multi-frequency absolute capacitance touch sensing, in accordance with one or more embodiments.

FIG. 4 shows a flowchart describing a method for multi-frequency simultaneous absolute-capacitive touch sensing, in accordance with one or more embodiments. In step (402), a sensing circuit (300) is coupled to a first electrode (210) disposed in a sensing region (120) of the input device (100). The sensing circuit (300) includes an amplifier (322) having an inverting input coupled to the first electrode (210). In step (404), a drive signal is applied to the non-inverting input of the amplifier (322) to generate a resulting signal on the output of the amplifier (322). The drive signal includes a first sinusoidal signal having a first operating frequency and a second sinusoidal signal having a second operating frequency. In step (406), the amplifier (322) generates from the resulting signal a sensing signal on the first electrode (210). The resulting signal is determined by the gain of the amplifier, a capacitance of the first electrode (210), and a feedback capacitor (324) coupled between the output and the inverting input of the amplifier (322). The capacitance of the first electrode (210) may be determined by measuring ($C_f+C_b$) with an input object present and measuring $C_b$ without the input object present. The value of $C_f$ can be determined by subtracting the two values.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A sensing circuit configured to detect an input object proximate a sensing region of an input device, comprising:
    an amplifier having an output and configured to output a resulting signal; and
    a plurality of mixers configured to receive the resulting signal and to generate a plurality of output signals, wherein at least one output signal of the plurality of output signals is selected based on a comparison of a signal-to-noise ratio of each of the plurality of output signals with a noise threshold, the at least one output signal being selected according to the following criteria:
        (a) based on none of the plurality of output signals being greater than the noise threshold, selecting a first combination of the plurality of output signals,
        (b) based on less than all of the plurality of output signals being greater than the noise threshold, selecting a second combination of one or more of the output signals that are less than the noise threshold,
        (c) based on all of the plurality of output signals being greater than the noise threshold, selecting an output signal having a lowest noise level,
    wherein the input object is detected using the selected at least one output signal.

2. The sensing circuit of claim 1, wherein the sensing circuit is coupled to a first electrode of a plurality of electrodes disposed in the sensing region of the input device.

3. The sensing circuit of claim 2, further comprising:
    a feedback capacitor coupled between the output of the amplifier and a first input of the amplifier, wherein the resulting signal is determined by the feedback capacitor and a capacitance of the first electrode caused by the input object, and wherein the resulting signal generates a sensing signal on the first electrode.

4. The sensing circuit of claim 3, wherein the first input of the amplifier comprises an inverting input, wherein the inverting input is coupled to the first electrode, and wherein the amplifier includes a non-inverting input coupled to a drive signal.

5. The sensing circuit of claim 4, wherein the drive signal comprises a first sinusoidal signal having a first operating frequency and a second sinusoidal signal having a second operating frequency.

6. The sensing circuit of claim 5, wherein the first operating frequency and the second operating frequency are different.

7. The sensing circuit of claim 5, wherein the first operating frequency is not an integer multiple of the second operating frequency and the second operating frequency is not an integer multiple of the first operating frequency.

8. The sensing circuit of claim 1, wherein the first combination comprises a mean of the plurality of output signals.

9. The sensing circuit of claim 1, wherein the second combination comprises a mean of the one or more of the output signals that are less than the noise threshold.

10. A system comprising:
a display; and
an input device coupled to the display comprising:
  a sensing circuit configured to detect an input object proximate a sensing region of the input device, the sensing circuit comprising:
    an amplifier having an output and configured to output a resulting signal; and
    a plurality of mixers configured to receive the resulting signal and to generate a plurality of output signals, wherein at least one output signal of the plurality of output signals is selected based on a comparison of a signal-to-noise ratio of each of the plurality of output signals with a noise threshold, the at least one output signal being selected according to the following criteria:
      (a) based on none of the plurality of output signals being greater than the noise threshold, selecting a first combination of the plurality of output signals,
      (b) based on less than all of the plurality of output signals being greater than the noise threshold, selecting a second combination of one or more of the output signals that are less than the noise threshold,
      (c) based on all of the plurality of output signals being greater than the noise threshold, selecting an output signal having a lowest noise level,
    wherein the input object is detected using the selected at least one output signal.

11. The system of claim 10, wherein the sensing circuit is coupled to a first electrode of a plurality of electrodes disposed in the sensing region of the input device.

12. The system of claim 11, further comprising:
a feedback capacitor coupled between the output of the amplifier and a first input of the amplifier, wherein the resulting signal is determined by the feedback capacitor and a capacitance of the first electrode caused by the input object, and wherein the resulting signal generates a sensing signal on the first electrode.

13. The system of claim 12, wherein the first input of the amplifier comprises an inverting input, wherein the inverting input is coupled to the first electrode, and wherein the amplifier includes a non-inverting input coupled to a drive signal.

14. The system of claim 13, wherein the drive signal comprises a first sinusoidal signal having a first operating frequency and a second sinusoidal signal having a second operating frequency.

15. The system of claim 10, wherein the first combination comprises a mean of the plurality of output signals.

16. The system of claim 10, wherein the second combination comprises a mean of the one or more of the output signals that are less than the noise threshold.

17. A method for operating a sensing circuit to detect an input object, the method comprising:
applying a drive signal to an amplifier to output a resulting signal;
generating a plurality of output signals from the resulting signal from the amplifier;
selecting at least one output signal of the plurality of output signals based on a comparison of a signal-to-noise ratio of each of the plurality of output signals with a noise threshold, the at least one output signal being selected according to the following criteria:
  (a) based on none of the plurality of output signals being greater than the noise threshold, selecting a first combination of the plurality of output signals,
  (b) based on less than all of the plurality of output signals being greater than the noise threshold, selecting a second combination of one or more of the output signals that are less than the noise threshold,
  (c) based on all of the plurality of output signals being greater than the noise threshold, selecting an output signal having a lowest noise level; and
detecting the input object using the selected at least one output signal.

18. The method of claim 17, further comprising:
determining the resulting signal using a feedback capacitor coupled between an output of the amplifier and a first input of the amplifier.

19. The method of claim 17, further comprising:
driving the amplifier with a first sinusoidal signal having a first operating frequency and a second sinusoidal signal having a second operating frequency, wherein the first operating frequency is different from the second operating frequency.

20. The method of claim 17, wherein the first combination comprises a mean of the plurality of output signals, and wherein the second combination comprises a mean of the one or more of the output signals that are less than the noise threshold.

* * * * *